United States Patent Office 2,978,485
Patented Apr. 4, 1961

2,978,485
N-NITROCARBAMATES

Milton B. Frankel, Pasadena, Calif., assignor to Aerojet-General Corporation, Azusa, Calif., a corporation of Ohio No Drawing. Filed June 9, 1955, Ser. No. 514,381

20 Claims. (Cl. 260—479)

This invention relates to new compositions of matter and a method for their preparation. In particular, it relates to N-nitrocarbamates having the general formula:

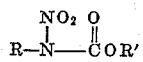

wherein R is a nitroalkyl or alkyl radical and R′ is an alkyl, cycloalkyl, nitroalkyl or nitroaryl radical, at least one R being a nitroalkyl radical.

The compounds of this invention are prepared by reacting a carbamate with nitric acid, in accordance with the general reaction scheme set forth below:

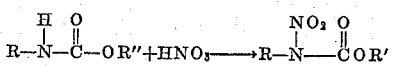

wherein R and R′ are as defined above, and R″ is an alkyl, cycloalkyl, nitroalkyl or aryl radical.

The nitration can be effected by nitric acid, fuming nitric acid or by a mixture of sulfuric and nitric acids. It is preferred however to use nitric acid in the presence of a dehydrating agent because of the solubility characteristics of the carbamates used as starting materials.

The reaction is preferably conducted at a temperature in the range of from about 0° to about 15° C. The reaction can be performed at higher temperatures; however, it is preferred to run the reaction at reduced temperature to permit better control of the reaction rate. Increased smoothness and control of the nitration is achieved when the reaction is conducted in the presence of dehydrating agent such as an alkanoic anhydride.

The carbamates used as starting materials in the practice of this invention are prepared by reacting a nitro isocyanate with an alcohol, as disclosed in my copending applications Serial No. 482,408, filed January 17, 1955, Serial No. 482,409, filed January 17, 1955, and Serial No. 482,410, filed January 17, 1955.

To more clearly illustrate my invention, the following examples are presented. It should be understood, however, that these examples are presented merely as a means of illustration, and are not intended to limit the scope of the invention in any way.

EXAMPLE I

*Preparation of N-nitro-N-3,3,3-trinitropropyl ethyl carbamate*

0.5 gm. of N-3,3,3-trinitropropyl ethyl urethane and 10 ml. of concentrated nitric acid were placed in a 50 ml. Erlenmeyer flask. The solution was heated on a steam bath for 1 hour, cooled, and poured onto ice. The resulting white solid was collected, washed with water, and dried, yielding 0.35 gm. of product, M.P. 92–96° C. Recrystallization from a mixture of 9 ml. of concentrated nitric acid and 1 ml. of water raised the melting point to 94–95° C. A second recrystallization did not raise the melting point. The sample was dried at room temperature and 2 mm. of mercury for 7 hours. The elemental analysis of the product is as follows:

Calculated for $C_6H_9N_5O_{10}$: Percent C, 23.16; percent H, 2.92; percent N, 22.51. Found: Percent C, 23.44; percent H, 2.97; percent N, 23.14.

EXAMPLE II

*Preparation of N-nitro-N-3,3,3-trinitropropyl cyclohexyl carbamate*

10 ml. of 100% nitric acid was cooled to 0° C. and 10 ml. of acetic anhydride was added dropwise. To the solution was added 0.3 gm. of N-3,3,3-trinitropropyl cyclohexyl carbamate. The solution was stirred at 0–5° C. for 1 hour and poured onto ice. After setting overnight the oil crystallized to give 0.3 gm. of a white solid, M.P. 56–57° C. The product was soluble in ethanol, carbon tetrachloride, chloroform, ethylene dichloride, cyclohexane, hexane, n-butanol, benzene, and diisopropyl ether, and insoluble in water. The product was purified by dissolving in absolute ethanol and precipitating out with water. This process was repeated 3 times to give a white crystalline solid, M.P. 56–58° C., impact stability >100 cm./2 kg. A sample was dried at room temperature and 2 mm. for 8 hours. The elemental analysis of the product is as follows:

Calculated for $C_{10}H_{15}N_5O_{10}$: Percent C, 32.88; percent H, 4.14; percent N, 19.18. Found: Percent C, 33.25; percent H, 4.21; percent N, 18.82.

EXAMPLE III

*Preparation of N-nitro-N-3,3,3-trinitropropyl nitrophenyl carbamate*

50 ml. of 100% nitric acid was placed in a 200 ml., 3-necked flask, fitted with a mechanical stirrer, thermometer and dropping funnel. The flask was cooled in an ice-salt bath and 50 ml. of acetic anhydride was added dropwise in 45 minutes, while the temperature was kept below 5° C. To the solution was added 4.05 gm. (0.0129 mole) of N-3,3,3-trinitropropyl phenyl carbamate. The solution was stirred at ice-bath temperature for 2.7 hours and poured onto ice. The gummy solid was collected, washed thoroughly with water and dried in vacuo over potassium hydroxide. The crude product, 4.7 gm., M.P. 80–115° C., was recrystallized from chloroform to give 2.0 gm. (38.4%) of white solid, M.P. 116–121° C. A sample was recrystallized twice from carbon tetrachloride, M.P. 127–129° C. dec., impact stability >100 cm./2 kg., and dried at 41° C. and 2 mm. for 4 hours. The elemental analysis of the product is as follows:

Calculated for $C_{10}H_8N_6O_{12}$: Percent C, 29.71; percent H, 2.00; percent N, 20.79. Found: Percent C, 29.22; percent H, 2.04; percent N, 19.73.

EXAMPLE IV

*Preparation of N-nitro-N-3,3,3-trinitropropyl-2,2,2-trinitroethyl carbamate*

A quantity of 250 ml. of 100% nitric acid was placed in a 1 liter, 3-necked flask, fitted with a mechanical stirrer, thermometer, and dropping funnel. The flask was cooled in an ice-salt bath and 250 ml. of acetic anhydride was added dropwise, while the temperature was kept at 0° C. N-3,3,3-trinitropropyl-2,2,2-trinitroethyl carbamate, 68.6 gm. (0.171 mole), was added and the solution was stirred at 0–5° C. for 75 minutes. The solution was poured onto stirred ice, and the white solid was collected, washed well with cold water and dried in vacuo over potassium hydroxide. The yield of N-nitro-N-3,3,3-trinitropropyl-2,2,2-trinitroethyl carbamate was 68.1 gm. (89.4%), M.P. 83–90° C. A sample was recrystallized 4 times from carbon tetrachloride, M.P. 96–97° C., impact stability=30 cm./2 kg., and dried at room temperature and 2 mm. overnight. The elemental analysis of the product is as follows:

Calculated for $C_6H_6N_8O_{16}$: Percent C, 16.15; percent

H, 1.36; percent N, 25.12. Found: Percent C, 16.35; percent H, 1.36; percent N, 25.34.

Calculated heat of combustion _____ 1495 cal./gm.
Found _____ 1487 cal./gm.
Lead block value _____ 187 TNT=100.
Ballistic mortar value _____ 144 TNT=100.

EXAMPLE V

*Preparation of N-nitro-N-3,3,3-trinitropropyl-2,2-dinitropropyl carbamate*

10 ml. of 100% nitric acid was cooled to 0° C. and 10 ml. of acetic anhydride was added dropwise. To the solution was added 0.5 gm. of N-3,3,3-trinitropropyl-2,2-dinitropropyl carbamate. While maintaining the temperature at about 0–10° C., the solution was stirred for 20 minutes. The solution was then poured over ice. The resulting white solid was washed with water and recrystallized from chloroform in 83.7% yield, M.P. 71–72° C. The elemental analysis of the product is as follows:

Calculated for $C_7H_9N_7O_{14}$: percent C, 20.25; percent H, 2.19; percent N, 23.62. Found: percent C, 20.51; percent H, 2.22; percent N, 24.05.

Calculated heat of combustion_____ 2033 cal./gm.
Found _____ 2051 cal./gm.
Lead block value_____ 153 TNT=100.
Ballistic mortar value_____ 140 TNT=100.

EXAMPLE VI

*Preparation of N-nitro-N-3,3-dinitrobutyl-2,2-dinitropropyl carbamate*

0.5 gm. of N-3,3-dinitrobutyl-2,2-dinitropropyl carbamate was dissolved in 10 ml. of acetic anhydride. The solution was added dropwise to 10 ml. of 100% nitric acid while maintaining the temperature at 5–10° C. The solution was stirred for 20 minutes and then poured over ice. The resulting white solid was washed with water and recrystallied from chloroform in 92.8% yield, M.P. 70–72° C. The elemental analysis of the product is as follows:

Calculated for $C_8H_{12}N_6O_{12}$: percent C, 25.01; percent H, 3.15; percent N, 21.88. Found: percent C, 25.96; percent H, 3.66; percent N, 21.73.

Calculated heat of combustion_____ 2666 cal./gm.
Found _____ 2643 cal./gm.
Lead block value_____ 117 TNT=100.
Ballistic mortar value_____ 126 TNT=100.

EXAMPLE VII

*Preparation of N-nitro-N-3,3-dinitrobutyl-2,2,2-trinitroethyl carbamate*

0.5 gm. of N-3,3-dinitrobutyl-2,2,2-trinitroethyl carbamate was dissolved in 10 ml. of acetic anhydride. The solution was added dropwise to 10 ml. of 100% nitric acid while maintaining the temperature at 5–10° C. The solution was stirred for 20 minutes and then poured over ice. The resulting white solid was washed with water and recrystallided from chloroform in 40.5% yield, M.P. 107–108° C. The elemental analysis of the product is as follows:

Calculated for $C_7H_9N_7O_{14}$: percent C, 20.25; percent H, 2.19; percent N, 23.62. Found: percent C, 20.26; percent H, 2.21; percent N, 23.67.

Calculated heat of combustion_____ 2032 cal./gm.
Found _____ 2007 cal./gm.
Lead block value_____ 153 TNT=100.
Ballistic mortar value_____ 140 TNT=100.

EXAMPLE VIII

*Preparation of N-nitro-N-methyl-2,2,2-trinitroethyl carbamate*

0.5 gm. of N-methyl-2,2,2-trinitroethyl carbamate was dissolved in 10 ml. of acetic anhydride. The solution was added dropwise to 10 ml. of 100% nitric acid while maintaining the temperature at 5–10° C. The solution was stirred for 20 minutes and then poured over ice. The resulting white solid was washed with water and recrystallized from diisopropyl ether in 74.3% yield, M.P. 39–40° C. The elemental analysis of the product is as follows:

Calculated for $C_4H_5N_5O_{10}$: percent C, 16.97; percent H, 1.78; percent N, 24.74. Found: percent C, 17.29; percent H, 1.86; percent N, 24.91.

Lead block value _____ 168 TNT=100.
Ballistic mortar value _____ 137 TNT=100.

EXAMPLE IX

*Preparation of N-nitro-N-ethyl-2,2,2-trinitroethyl carbamate*

0.5 gm. of N-methyl-2,2,2-trinitroethyl carbamate was dissolved in 10 ml. of acetic anhydride. The solution was added dropwise to 10 ml. of 100% nitric acid while maintaining the temperature at 5–10° C. The solution was then poured over ice. The resulting white solid was washed with water and recrystallized from carbon tetrachloride in 85.7% yield, M.P. 50–51° C. The elemental analysis of the produce is as follows:

Calculated for $C_5H_7N_5O_{10}$: percent C, 20.21; percent H, 2.38; percent N, 23.57. Found: percent C, 20.55; percent H, 2.04; percent N, 23.68.

Lead block value _____ 168 TNT=100.
Ballistic mortar value _____ 137 TNT=100.

Any member of the N-nitrocarbamate series can be prepared by merely nitrating an appropriate nitrocarbamate, in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge; and can be caused to explode on operation of an impact- or time fuse-mechanism firing a detonating explosive such as lead azide or mercury fulminate.

I claim:

1. As compositions of matter, N-nitrocarbamates having the general formula:

$$\begin{array}{c} NO_2 \;\; O \\ | \;\;\;\; \| \\ R-N-C-O-R' \end{array}$$

wherein R is a radical selected from the group consisting of nitroalkyl and alkyl radicals and R' is a radical selected from the group consisting of alkyl, cycloalkyl, nitroalkyl and nitroaryl radicals, at least one R being a nitroalkyl radical.

2. As a composition of matter, N-nitro-N-3,3,3-trinitropropyl ethyl carbamate having the structural formula:

$$\begin{array}{c} NO_2 \quad\quad\quad NO_2 \;\; O \\ | \quad\quad\quad\quad | \;\;\;\; \| \\ NO_2-C-CH_2CH_2-N-C-O-CH_2CH_3 \\ | \\ NO_2 \end{array}$$

3. As a composition of matter, N-nitro-N-3,3,3-trinitropropyl cyclohexyl carbamate having the structural formula:

$$\begin{array}{c} NO_2 \quad\quad\quad NO_2 \;\; O \quad\quad CH_2-CH_2 \\ | \quad\quad\quad\quad | \;\;\;\; \| \quad\quad / \quad\quad \backslash \\ NO_2-C-CH_2CH_2-N-C-O-CH \quad\quad CH_2 \\ | \quad\quad\quad\quad\quad\quad\quad\quad\quad\quad \backslash \quad\quad / \\ NO_2 \quad\quad\quad\quad\quad\quad\quad\quad\quad\quad CH_2-CH_2 \end{array}$$

4. As a composition of matter, N-nitro-N-3,3,3-trinitropropyl nitrophenyl carbamate having the structural formula:

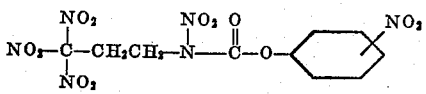

5. As a composition of matter, N-nitro-N-3,3,3-trinitropropyl-2,2,2-trinitroethyl carbamate having the structural formula:

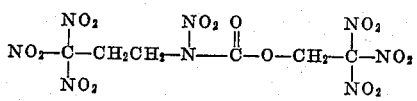

6. As a composition of matter, N-nitro-N-3,3,3-trinitropropyl-2,2-dinitropropyl carbamate having the structural formula:

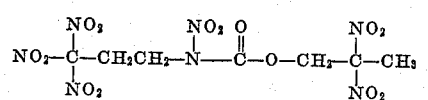

7. As a composition of matter, N-nitro-N-3,3-dinitrobutyl-2,2-dinitropropyl carbamate having the structural formula:

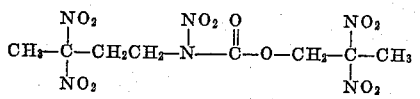

8. As a composition of matter, N-nitro-N-3,3-dinitrobutyl-2,2,2-trinitroethyl carbamate having the structural formula:

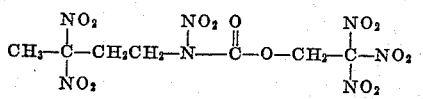

9. As a composition of matter, N-nitro-N-methyl-2,2,2-trinitroethyl carbamate having the structural formula:

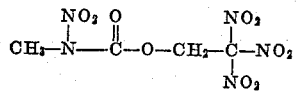

10. As a composition of matter, N-nitro-N-ethyl-2,2,2-trinitroethyl carbamate having the structural formula:

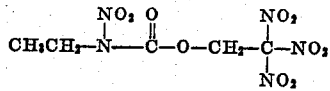

11. The method of preparing N-nitrocarbamates having the general formula:

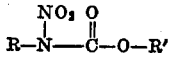

which comprises reacting nitric acid with a nitrocarbamate having the general formula:

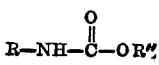

wherein R is a radical selected from the group consisting of nitroalkyl and alkyl radicals, R' is a radical selected from the group consisting of alkyl, cycloalkyl, nitroalkyl and nitroaryl radicals and R" is a radical selected from the group consisting of alkyl, cycloalkyl, nitroalkyl and aryl radicals.

12. The method of preparing N-nitro-N-3,3,3-trinitropropyl ethyl carbamate which comprises reacting N-3,3,3-trinitropropyl ethyl carbamate with nitric acid.

13. The method of preparing N-nitro-N-3,3,3-trinitropropyl cyclohexyl carbamate which comprises reacting N-3,3,3-trinitropropyl cyclohexyl carbamate with nitric acid.

14. The method of preparing N-nitro-N-3,3,3-trinitropropyl nitrophenyl carbamate which comprises reacting N-3,3,3-trinitropropyl phenyl carbamate with nitric acid.

15. The method of preparing N-nitro-N-3,3,3-trinitropropyl-2,2,2-trinitroethyl carbamate which comprises reacting N-3,3,3-trinitropropyl-2,2,2-trinitroethyl carbamate with nitric acid.

16. The method of preparing N-nitro-N-3,3,3-trinitropropyl-2,2-dinitropropyl carbamate which comprises reacting N-3,3,3-trinitropropyl-2,2-dinitropropyl carbamate with nitric acid.

17. The method of preparing N-nitro-N-3,3-dinitrobutyl-2,2-dinitropropyl carbamate which comprises reacting N-3,3-dinitrobutyl-2,2-dinitropropyl carbamate with nitric acid.

18. The method of preparing N-nitro-N-3,3-dinitrobutyl-2,2,2-trinitroethyl carbamate which comprises reacting N-3,3-dinitrobutyl-2,2,2-trinitroethyl carbamate with nitric acid.

19. The method of preparing N-nitro-N-methyl-2,2,2-trinitroethyl carbamate which comprises reacting N-methyl-2,2,2-trinitroethyl carbamate with nitric acid.

20. The method of preparing N-nitro-N-ethyl-2,2,2-trinitroethyl carbamate which comprises reacting N-ethyl-2,2,2,-trinitroethyl carbamate with nitric acid.

References Cited in the file of this patent

UNITED STATES PATENTS

| | | |
|---|---|---|
| 2,485,855 | Blomquist et al. | Oct. 25, 1949 |
| 2,758,132 | Thomas | Aug. 7, 1956 |

FOREIGN PATENTS

| | | |
|---|---|---|
| 138,456 | Sweden | Dec. 23, 1952 |

OTHER REFERENCES

Hackh's Chemical Dictionary, 3rd Ed., Blakiston Co., Philadelphia (1950), page 572.

Curry et al.: Jour. Am. Chem. Soc., 70 (1951), pages 5043-6.

Curry et al.: Jour. Am. Chem. Soc., vol. 73 (1951), pages 5043-6.